US009626229B1

(12) United States Patent
Krolak et al.

(10) Patent No.: US 9,626,229 B1
(45) Date of Patent: Apr. 18, 2017

(54) PROCESSOR PERFORMANCE MONITORING UNIT SYNCHRONIZATION

(71) Applicant: International Business Machines Corporation, Armonk, NY (US)

(72) Inventors: David J. Krolak, Rochester, MN (US); Charles F. Marino, Round Rock, TX (US); Sooraj R. Nair, Bangalore (IN); Srinivas Purushotham, Bangalore (IN); Srinivasan Ramani, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/990,102

(22) Filed: Jan. 7, 2016

(51) Int. Cl.
*G06F 9/46* (2006.01)
*G06F 9/52* (2006.01)

(52) U.S. Cl.
CPC ..................... *G06F 9/52* (2013.01)

(58) Field of Classification Search
None
See application file for complete search history.

(56) References Cited

U.S. PATENT DOCUMENTS

| 8,832,416 | B2 | 9/2014 | Chen et al. | |
|---|---|---|---|---|
| 8,904,392 | B2 * | 12/2014 | Chiu | G06F 11/3409 718/100 |
| 2014/0201406 | A1 * | 7/2014 | Balakrishnan | G06F 1/3203 710/110 |
| 2014/0281149 | A1 | 9/2014 | Roberts et al. | |

OTHER PUBLICATIONS

Abbasy et al., "A Unified Approach for the Optimal PMU Location for Power System State Estimation.", IEEE Transactions on Power Systems, vol. 24, No. 2, May 2009, pp. 806-813.
Floyd, et al., "System Power Management Support in the IBM Power6 Microprocessor", IBM Journal of Research and Development, vol. 51, No. 6, Nov. 2007, pp. 733-746.
Mericas et al. "IBM POWER8 performance features and evaluation." IBM Journal of Research and Development, vol. 59, No. 1, Jan./Feb. 2015, 10 pp.
Sinharoy et al. "Advanced features in IBM POWER8 systems." IBM Journal of Research and Development, vol. 59, No. 1, Jan./Feb. 2015, 18 pp.
Sinharoy et al. "IBM POWER8 processor core microarchitecture." IBM Journal of Research and Development, vol. 59, No. 1, Jan./Feb. 2015, 21 pp.

* cited by examiner

*Primary Examiner* — Dong Kim
(74) *Attorney, Agent, or Firm* — Patterson + Sheridan, LLP

(57) ABSTRACT

A method for monitoring performance of events occurring in a multiprocessor system is provided where the performance monitoring units (PMUs) are globally synchronized. The global synchronization is carried out with a dedicated bit field set to any of pause, stop, restart, or reset command. The command is sent across the scan communications interface (SCOM) of all chips by using existing fabric connecting all nest units to control the PMUs in the system. A pre-scale counter before a main counter may be used to buffer event counts until a reset or a restart command is sent to the SCOM in the system.

20 Claims, 3 Drawing Sheets

PROCESSOR PERFORMANCE MONITORING UNIT SYNCHRONIZATION

I. FIELD OF THE DISCLOSURE

The present disclosure relates generally to computing systems, and more particularly, to methods and systems for global synchronization of processor performance monitoring units (PMU).

II. BACKGROUND

High performance computing (HPC) refers to computing systems used by scientists and engineers for using high performance processors to model, simulate, and analyze complex physical or algorithmic phenomena. Performance monitoring and optimization of processors in HPC is enhanced through hardware performance monitors in the processor and chip. To improve software performance, some HPC processors are provided with the capability for dynamic performance tuning through run-time monitoring and optimization. Hardware assists are available on some processors to enable continuous monitoring of core, chip, and system performance, e.g., by counting various performance-related events in the processor.

III. SUMMARY OF THE DISCLOSURE

According to a particular embodiment, a computer implemented method to monitor performance of events occurring in a multiprocessor system with a plurality of performance monitoring units (PMUs) is disclosed. The method includes providing a dedicated bit field and a register operation to toggle the bit field. The bit field is set to any of pause, stop, restart, or reset command to control the PMUs in the system. The command is sent across the scan communications interface (SCOM) of all chips by using existing fabric connecting all nest units.

According to another embodiment, a multi-processor system is disclosed. The multi-processor system comprises a plurality of processor units, with each processor unit generating signals representing occurrences of events at the processor unit. Each processor unit includes a scan communication interface (SCOM) and a nest unit for gathering performance monitoring data. The system includes a computing fabric for connecting the nest units in the system. There may be performance monitoring units (PMUs) for monitoring performance of the events at the processor units. The system is provided with a register operation with a bit field command set to any of pause, stop, restart, or reset, and a computer-readable storage medium comprising instructions executable by the processor to send the bit field command across the SCOM by using the fabric connecting all nest units to globally synchronize the PMUs in the system.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

IV. DETAILED DESCRIPTION

Figure 1:
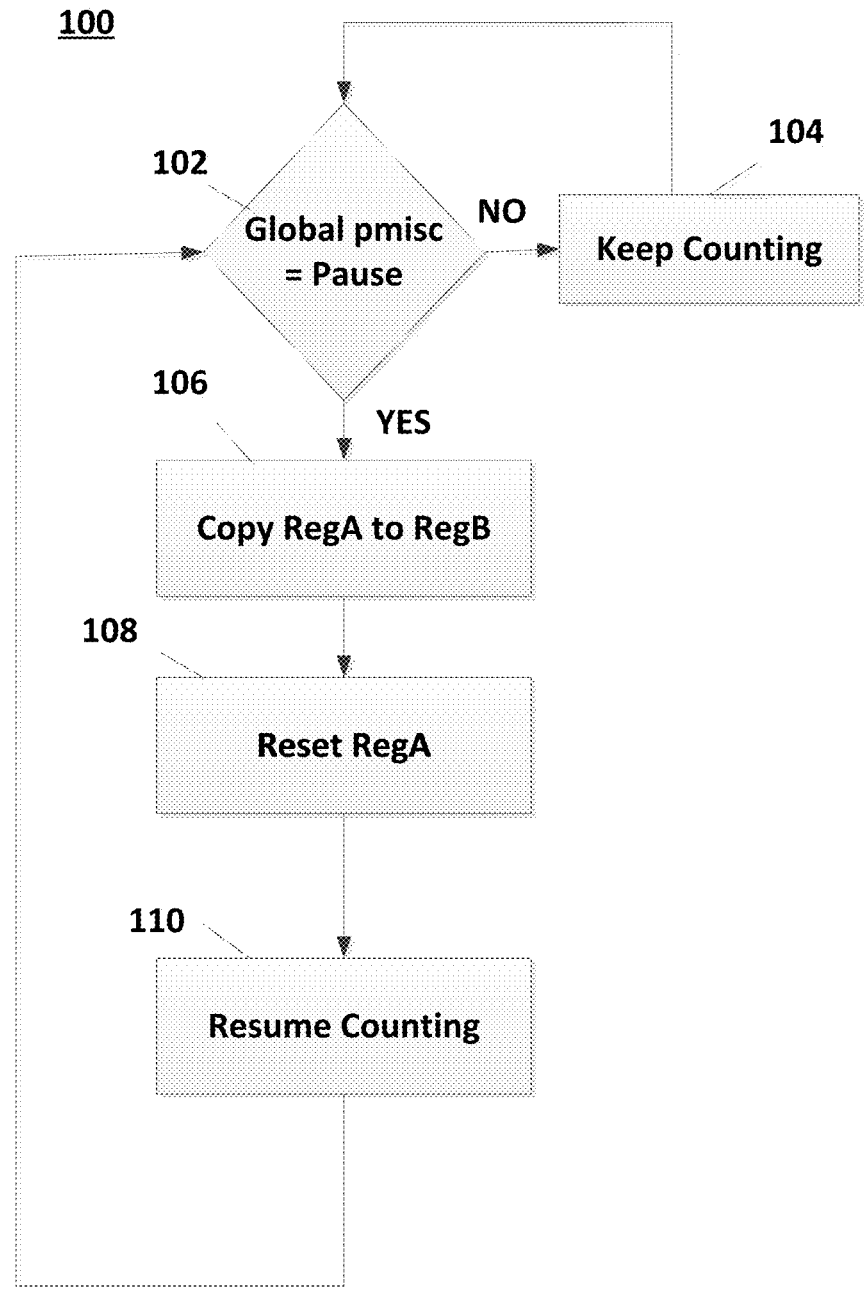
FIG. 1 is a block diagram of an embodiment of a hardware loop for global synchronization to avoid missing events.

In high performance computing (HPC) systems with processors having performance monitoring units (PMUs) to gather performance monitoring data at a chip level, the PMUs may play a role in enhancing or degrading the system level performance. The disclosure provides a solution for global synchronization of PMUs. For example, a system and process for monitoring performance of events occurring in a multiprocessor system is provided where the PMUs are globally synchronized. The global synchronization is carried out with a dedicated bit field set to any of pause, stop, restart, or reset operation. The bit field is sent across the scan communications interface (SCOM) of all chips by using existing fabric connecting all nest units to control the PMUs in the system. A pre-scale counter before a main counter may be used to buffer event counts until a reset or a restart command is sent to the SCOM in the system.

Multiple PMUs in a complex may be synchronized prior to reading them all to obtain coherent-in-time values from counters in the PMUs. Having accomplished the synchronization, accurate counts are obtained of events occurring during a freeze period. An embodiment uses a prescale as a buffer to contain counts of the events during the synchronizing, i.e., freeze period.

An embodiment includes synchronization of PMUs with little time variation between chips. A special pmisc command may be sent to chips. The chips may snoop a bus and recognize the special pmisc command. When receiving the pmisc command, PMU counters may be initialized and activated. A later command may be used to stop the counters or take a snapshot of the registers in a second register for each PMU. Once the snapshot has been taken, registers may be leisurely read to determine activity level for the desired elapsed time for all chips in the system. An embodiment of the system may use a command to stop all counters when a first counter to reach its counting limit is reached.

For purposes of this disclosure, performance monitoring unit, or PMU, refers a performance monitoring facility in a processor, built into the hardware for tracking various performance characteristics such as instructions executed, cache misses, processor stalls and other performance related events.

PMUlet refers to chip level self-contained PMU distributed across a chip. Scan communications interface, or SCOM, refers to a specialized interface into the chip pervasive logic that allows specific latches to be updated while functionally in use. Fabric refers to a computing fabric with interconnected nodes that look like a weave or a fabric when viewed/envisaged collectively from a distance, as related to a consolidated high-performance computing system with loosely coupled storage, networking and parallel processing functions. The fundamental components of fabrics include nodes (e.g., processor(s), memory, and/or peripherals), as well as links referencing the functional connection between nodes.

PCIe refers to PCI Express (Peripheral Component Interconnect Express), a high-speed serial computer expansion bus standard with hardware support for input/output (I/O) virtualization. NVLink refers to a higher performing interconnect than PCIe, enabling fast communication between the GPU (graphics processing unit) and CPU (central processing unit), and between GPUs.

Nest unit refers to the nest instrumentation in a processor to gather performance monitoring data at a chip level. This may include units such as the coherent and data interconnect, memory controller, accelerators, memory coherence directory, coherently attached processor proxy, memory buffer chips, PCIe interface to coherent and data interconnect, and off-chip links connecting to other chips. In one embodiment, the nest unit is architected to include PMU events helpful for computing performance-related metrics, such as bandwidth, cache miss rates, command issue rate, resource contention, conflicts, and utilizations for the nest unit.

Centralized nest performance monitor (CNPM) refers to nest units and events that are synchronous to on-chip coherent and data interconnect clock, which drive events on a shared bus that feeds PMUlets. CNPM is distinguished from distributed nest performance monitor or DNPM, referring nest units and events that are asynchronous to the on-chip coherent and data interconnect clock.

PB refers to processor bus. PB transactions refer to transactions initiated by the processor bus, e.g., processor initiated transactions that issue the shut-down, halt, or stop grant acknowledge message passed to the PCI bus or an interconnect as a special cycle transaction, processor-initiated IO read or write, etc.

Memory controller synchronous, or MCS, refers to a processor unit that provides the memory controller interface to the fabric at processor bus speeds and supports selective memory mirroring. Snoop refers to a command or a step to capture packets from the network, e.g., to monitor network traffic or trouble network related issues like packet drops, high network latency. Snoop may use both the network packet filter and streams buffer modules.

Performance monitor counters, or PMC, or hardware performance counters, or hardware counters, refers to special-purpose registers built into the processor to store the count of hardware-related activities within computer systems, for use in conducting performance analysis or tuning.

In HPC systems, PMU events may be instrumented in each of the nest units with dedicated PMU counters to monitor the performance at the system level and take corrective action by tuning system parameters for getting better performance. The PMU may be shared between multiple processor units. The system may have input devices for receiving signals from the processor units, or for programming the PMU by implementing certain logics. The PMU is highly secure and may be accessible by an operating system under a privileged execution level. The operating system may utilize this access to assist in determining the performance of the processor under certain conditions. The PMU may include a set of counters that allow counting processor events and system events on the chip, such as cache misses, pipeline stalls and floating point operations. This counter block, referred to as performance counters, may be used for monitoring system components such as processors, memory, and network I/O.

The PMU may contain one or more thread-level performance monitor counters (PMCs), core-level hypervisor PMCs (HPMCs), and thread-level supervisor PMCs (SPMCs). PMCs accumulate the occurrence of internal events that impact the performance of a processor, e.g., counting signals representing occurrences of events from one or more processor units. For example, a PMU may monitor processor cycles, memory, network I/O, instructions completed, or delay cycles that execute a load from memory.

Most of the nest units are in different clock domains, physically distributed across the chip and have separate PMU's for CNPM and other distributed units like links. As PMU access is a serial access, multiple PMUs cannot be accessed at the same time in SCOM arbitration. Therefore, each PMU is accessed in a different time frame, which may create inaccurate event collection at correction across the PMUs.

Statistics of processor events can be collected in hardware with little or no overhead from operating system and application running on it, making these counters a powerful means to monitor an application and analyze its performance. Additionally, the statistics are useful in optimizing the architecture of a processor and the instructions that the processor executes. The counters do not require recompilation of applications. In one example, the counters can provide the total number of clock cycles and the number of instructions executed, from which a cycle per instruction figure can be derived. The total number can be a good indicator of the core's efficiency in a particular section of code.

In one example of a high performance processor, e.g., a POWER8™ processor from International Business Machine (IBM) Corporation with per-chip Nest Instrumentation that provides various per-chip metrics like memory, powerbus, Xlink and Alink bandwidth, there are 4 PMUlets on CNPM, 2 on Xlinks and Alinks each, and 3 on CENTAUR™ chip. The CNPM has the capability to count 16 distinct events spread across the 4 PMUlets (4 counters per PMUlet).

Table 1 shows four, sequence and related events A, B, C, and D:

| Operation | Wait time in ms | Event A count on PMUlet 0 | Event B count on PMUlet 1 | Event C count on PMUlet 2 | Event D count on PMUlet 3 |
| --- | --- | --- | --- | --- | --- |
| SCOM read for PMUlet 0 | 0 | <u>10</u> | 5 | 20 | 2 |
| SCOM read for PMUlet 1 | 30 | 20 | <u>6</u> | 21 | 3 |
| SCOM read for PMUlet 2 | 60 | 30 | 8 | <u>21</u> | 4 |
| SCOM read for PMUlet 3 | 90 | 40 | 13 | 25 | <u>5</u> |
| READ complete | <u>90</u> | 10 | <u>6</u> | 21 | <u>5</u> |

As shown above, the events are set up on four counters on four different PMUlets. Each PMUlet is SCOM-read sequentially in a loop with the intention of collecting counter values at different points throughout a run for analysis. When one PMUlet is being read, the others continue counting. In Table 1, each SCOM reads takes about 30 ms each, with the counts being obtained across 4 PMUlets (e.g., A, B, C, D) in four distinct time windows. Hence, the event counter read from PMUlet 0 may be 120 ms earlier than an event count read on the fourth PMUlet (PMUlet 3), assuming that all of them are read sequentially.

As shown, the data read out at 90 ms is from different time zones and is not correlated, resulting in analysis that may not be meaningful. Additionally, there is an issue of connecting fundamental PB transactions with resultant unit level transactions, e.g., an MCS command, and eventual data transfer would be difficult.

One solution is to put the events of interest on the same PMUlet (e.g., 4 counters or N-counter for POWER8™ processors). Counting cycles for reference on one of the counters leaves space for only three events (e.g. N-counter minus one) that can be analyzed for the same time window for correlation. However, this may limit analysis using PMUlets. Another solution involves providing a freeze logic that freezes all counters in a PMUlet if any counter in the PMUlet overflows, but not beyond this PMUlet. However, this approach may not increase accuracy.

An embodiment provides controls all of the PMU counters that are distributed in location and in different clock domains. This technique may result in correct PMU data collected across the chip for correlation and meaningful performance metrics. In one example, a bit is set, e.g., "freeze_until_all_read" (or FREEZE) to freeze all the PMUlets of the PMU. If any gets a read command and unfreeze, counting is resumed only when all PMUlets have been read (for CNPM). This would give 16 events (e.g., four times N-counter for POWER8™ processors) in the same time-window. Potentially, there can be 15 synchronous event counts (four times N-counter minus one) to analyze for a particular time window desired by the analyst. Cycles may be counted as a reference on one of the counters. The configurable instruction "Freeze_until_all_read" behavior allows the flexibility of turning off the feature with the counters behaving in an uncorrelated fashion if the requirement is that no event be missed, similar to an enable/disable bit. The CNPM PMUlet example in Table 1 has been reworked as shown in Table 2 with an illustrative "freeze_until_all_read" in operation, allowing the correlation of events A, B, C, D as they pertain to the same counting interval:

external agent, such as a user, or tools that continuously access PMU event counters. When the user wishes to control all the PMUs globally, either to pause, stop, restart or reset, the control may be initiated by setting the respective field (e.g., by toggling). This setting may send out a powerbus-type "pmisc" command to control globally all PMUs as defined by the bit. Pmisc commands may be snooped by all PMUs and will act as per required control action.

In some embodiments, the PMUlets that are frozen communicate to global-sync unit to freeze all PMUlets of the nest units. In other embodiments, the PMUlets, themselves, may define when to freeze and when to restart the counters globally. In order to know that all PMUlets are read and that PMUlets can reset counters, the added new bit pauses all nest unit PMUlet counters (0b0) and resets the counters (0b1) upon read of all the registers. The bit can be made a default for all banks of PMUlets (e.g., CNPM, NVLinks, etc.) with a bit "freeze bank," for example. If the global-SCOM sync bit is set to disable, then it may be applicable to all units that have this bit enabled.

In order to count events that are generated across the systems for the time frame between pause till reset or between stop and restart while the global pause action is set, a pre-scale counter before the main counter is provided. The pre-scale counter may act like a buffer accumulating the main counter until till a reset/restart command is issued. If a counter reset signal is sent, then both the pre-scale counter and the main counter are reset. On the other hand, if a counter restart signal is sent, the main counter may be reset, while the pre-scale counter still retains the previously accumulated count and any events counted during the duration of pause-restart.

| Operation | Wait time in ms | Event A count on PMUlet 0 | Event B count on PMUlet 1 | Event C count on PMUlet 2 | Event D count on PMUlet 3 | Configuration |
|---|---|---|---|---|---|---|
| SCOM read for PMUlet 0 | 0 | 10 | 5 | 20 | 2 | Assert Freeze_all_until_read via PB |
| SCOM read for PMUlet 1 | 30 | 10 | 5 | 20 | 2 | |
| SCOM read for PMUlet 2 | 60 | 10 | 5 | 20 | 2 | |
| SCOM read for PMUlet 3 | 90 | 10 | 5 | 20 | 2 | Unfreeze_all via PB |
| | 120 | 20 | 6 | 21 | 3 | |
| | 150 | 25 | 7 | 26 | 6 | |
| SCOM read for PMUlet 0 | 180 | 28 | 9 | 27 | 7 | Assert Freeze_all via |
| SCOM read for PMUlet 1 | 210 | 28 | 9 | 27 | 7 | |
| SCOM read for PMUlet 2 | 240 | 28 | 9 | 27 | 7 | |
| SCOM read for PMUlet 3 | 270 | 28 | 9 | 27 | 7 | Unfreeze_all via PB |

In this implementation, the SCOMs are globally synchronized, for an efficient and feasible approach instead of a network/mesh of physical wires over the PMUs across the chip. As there is already a path/interconnect that runs through all the nest units (Fabric/PB), SCOM can be controlled/globally synchronized by sending out sync/control commands globally across the chip. This is carried out by a separate command from an external tool with a global-sync register (SCOM register) and a dedicated set bit field (one bit). With a new bit that can communicate to global sync SCOM register, global synchronization may be accomplished with minimum change to have all nest units PMUlets freeze on any PMUlet FREEZE command, or periodic as requested by the user.

The global SCOM bit as embedded in the design is transparent to the user, and will pause, restart all nest units based on bit set. This control can be carried out by an Using an existing infrastructure (e.g., fabric) and existing fabric protocol may obviate the need of a separate global-sync hardware unit. Additionally, with minimal addition of 1 wire/bit and extension of the pmisc field, global synchronization of the PMUs is accomplished efficiently. The method is efficient with hardware automatically controlling the freeze of counters and causing an interrupt for tools to harvest the data. The task of freeze, reset, or pause activity may be offloaded from a core and directly taken as a fabric command. Action is taken, providing accurate PMU data at system level with corrective action taken in the same time frame. Pre-scaling may during the avoid missing any event when the global PMUs are in pause/freeze state.

As the hard performance counters, themselves, may be used to control the entire nest unit performance counters, all the PMUs that are distributed and in different clock domains may be controlled. Further, with the counters themselves controlling the system synchronization of all the PMUs, the PMU data collected across the chip may be more accurate and suitable for correlation, for meaningful performance metrics.

Referring to FIG. 1, a flowchart 100 shows an embodiment logically abstracted into a hardware loop for global synchronization to avoid missing events. The hardware loop may perform manage register operation, e.g., toggling of a bit field. As shown in the hardware loop of FIG. 1, a pmisc command may be received and evaluated by the hardware at 102 of FIG. 1. If the pmisc command is determined not correspond to a PAUSE, counting may continue at 104. If the pmisc command alternatively indicates a PAUSE, the active counters may be copied to the back-up counters (e.g., copy RegA to RegB) at 106. Where the copy is made to back-up RegB, two windows may be processed in an overlap fashion. While the prior window is being processed, the next window may be collected. The active counter may be reset to zero at 108. The system may resume counting at 110 of FIG. 1.

Figure 2:
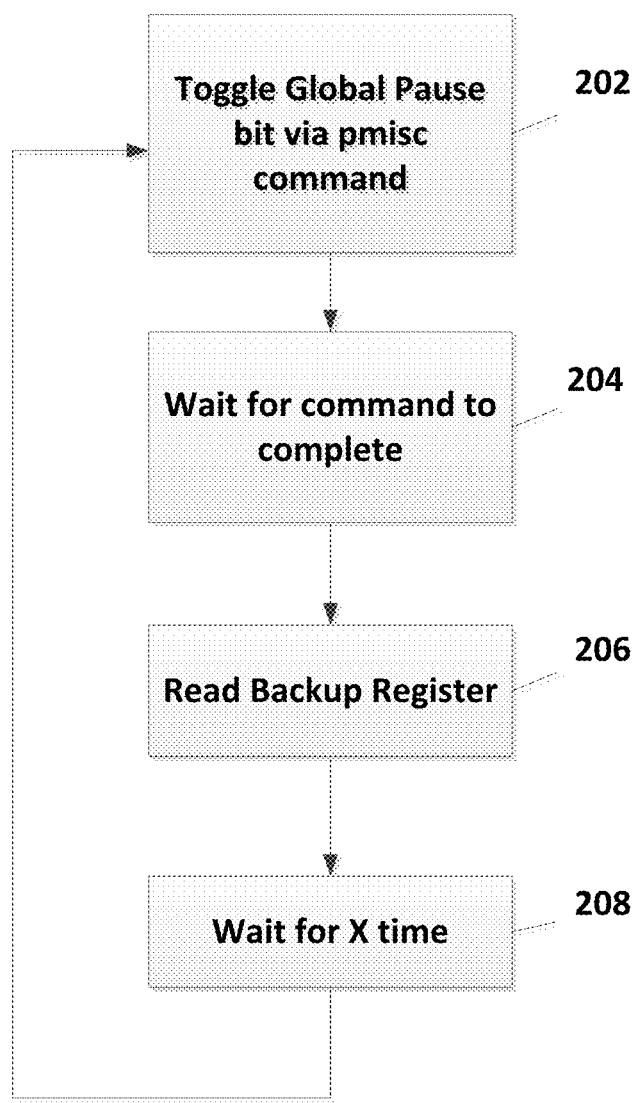
FIG. 2 is a block diagram of an embodiment of a software loop for global synchronization to avoid missing events.

Referring to FIG. 2, a flowchart 200 shows an embodiment logically abstracted into a software loop for global synchronization to avoid missing events. The software loop of an embodiment performs the performance monitor function and controls the hardware with logics for a register operation, e.g., toggling of a bit field. The flowchart 200 may correspond to the method shown in the embodiment of the hardware loop of FIG. 1.

A pmisc command may be issued at 202 to toggle the global pause bit. In the software loop 200, once the pmisc command is complete at 204, the back-up counters (e.g., RegB) may be read at 206. The system may wait for a period of time X at 208, and then the software loop may repeat.

Figure 3:
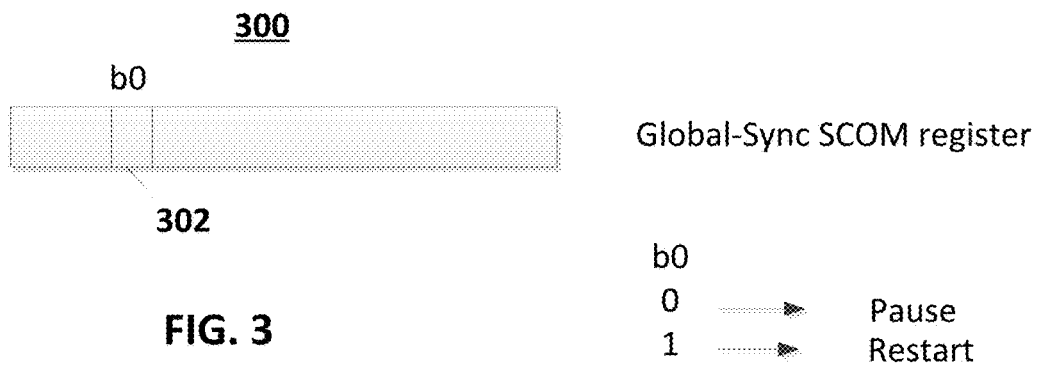
FIG. 3 is a block diagram illustrating a representative user-controlled global SCOM bit.

FIG. 3 is a block diagram illustrating a global-synch SCOM register of an embodiment. As discussed herein, a global pmisc command is a command that can be brought across all units and all the chips, to toggle a single wire. A representative user controlled global SCOM bit 302 is illustrated in FIG. 3. In each PMU area, a wire may be used to keep the running of the counters. When the signal on the wire goes from zero to one, the transition may cause the hardwire loop to reset the counters (e.g., reset RegA and resume).

Figure 4:
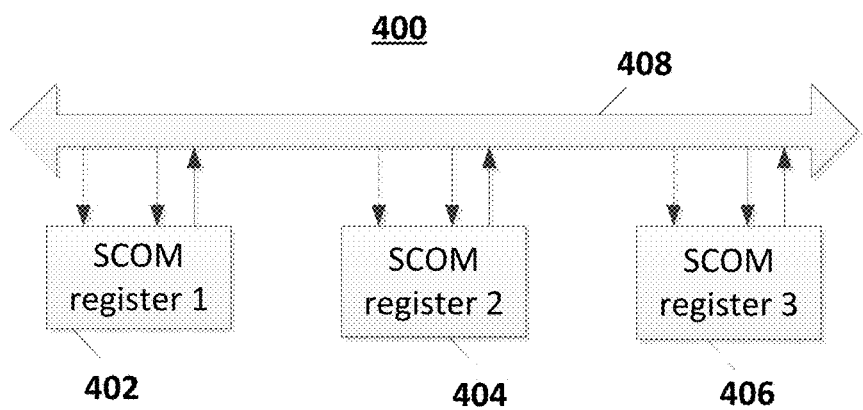
FIG. 4 illustrates a system for global synchronization of SCOMs (System Center Operations Managers) by sending out a control command globally across the chips.

FIG. 4 illustrates a system 400 configured to perform global synchronization of SCOMs by sending out a pmisc control command globally across a microchip. The pmisc control command may be sent out from an external tool through all nest units (Fabric or PB, for system interconnect), with a global sync register (e.g., SCOM register) and a dedicated set bit field control logic. The bit field (e.g., one bit) may trigger a command based on the fabric protocol with a specific setting. The user may control all PMUs of SCOM registers 402, 404, 406 globally, either to pause, stop, restart or reset, by setting a respective field 302. The setting may send out a Powerbus pmisc to control all the PMUs as defined by the bit(s). As shown in FIG. 4, the pmisc command may be snooped via a bus 408 and other connections (e.g., dotted lines) of the fabric by all the PMU units.

Figure 5:
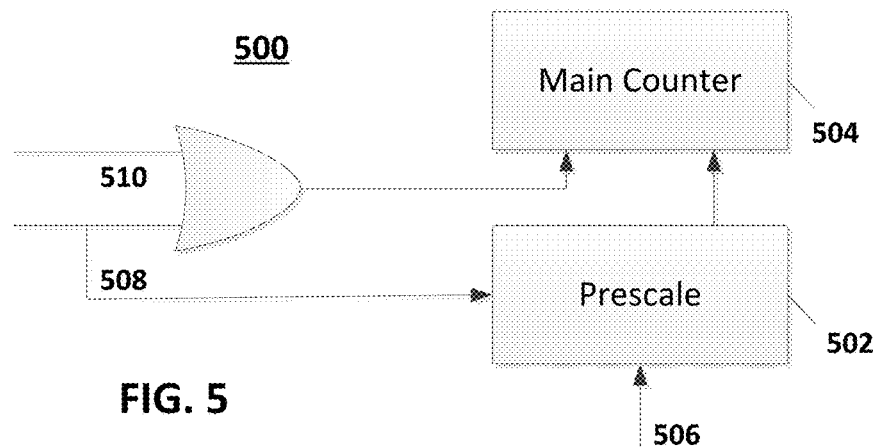
FIG. 5 is a block diagram of a system implementing a pre-scale counter acting like buffer to avoid missing events.

FIG. 5 is a block diagram of a system 500 implementing a pre-scale counter that may act like a buffer to avoid missing events. As shown with a pre-scale counter 502 before the main counter 504, the pre-scale counter 502 acts like a buffer for the main memory accumulating hardware events 506 that occur until a global hardware reset counter 508 or global hardware restart counter 510 is issued. If the pre-scale period is shorter than the SCOM read period, events may be missed. Additionally, if the pre-scale counter wraps without notice, events occurring during the pause-restart may be missed.

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

Integrated circuits or chips that may be designed and/or fabricated in accordance with the described techniques can be distributed by a fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to explain the principles of the embodiments, the practical application or technical improvement over technologies found in the marketplace, or to enable others of ordinary skill in the art to understand the embodiments disclosed herein.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with the appended claims, and equivalents thereof.

The invention claimed is:

1. A computer implemented method to monitoring performance of events occurring in a multiprocessor system, the method comprising:
   providing a register operation that includes a bit field command set to at least one of a pause, a stop, a restart, or reset operation; and
   sending the bit field command across a scan communications interface (SCOM) using a computing fabric,
   wherein sending the bit field command across the SCOM globally synchronizes a plurality of performance monitoring units (PMUs).

2. The method of claim 1, wherein the plurality of PMUs are set to freeze upon receiving the bit field command.

3. The method of claim 1, wherein the plurality of PMUs are set to freeze periodically upon receiving the bit field command.

4. The method of claim 1, wherein sending the bit field command across the SCOM further comprises sending a Powerbus type pmisc to the plurality of PMUs.

5. The method of claim 4, wherein the global synchronization of the PMUs provides correlation of counter values from nest units in the system.

6. The method of claim 5, wherein the correlation of values from nest units in the system occurs during any period of the pause and the reset operations.

7. The method of claim 5, wherein the correlation of values from nest units in the system occurs during any period of a stop and a restart operation.

8. The method of claim 1, further comprising providing a pre-scale counter before a main counter.

9. The method of claim 8, wherein the pre-scale counter buffers event counts until a bit field command of the reset or restart operation is sent to the SCOM in the system.

10. The method of claim 1, further comprising setting the bit field command is set to the pause operation.

11. The method of claim 10, further comprising:
   copying active counters to back-up counters;
   resting active counters to zero; and
   resuming counting.

12. The method of claim 11, further comprising reading the back-up counters.

13. A multi-processor system comprising:
- a plurality of processor units, wherein each processor unit generates signals representing occurrences of events at the processor unit, wherein each processor unit includes a scan communication interface (SCOM);
- a plurality of performance monitoring units (PMUs) for monitoring performance of the events at the processor units;
- a register operation with a bit field command set to any of pause, stop, restart, or reset; and
- a non-transitory computer-readable storage medium comprising instructions executable to send the bit field command across the SCOM by using a computing fabric to globally synchronize the PMUs in the system, wherein the plurality of processor units and the plurality of performance monitoring units are implement by the multi-processor system.

14. The system of claim 13, wherein sending the bit field command across the SCOM includes sending a powerbus type pmisc to the PMUs in the system.

15. The system of claim 13, wherein the global synchronization of the PMUs in the system provides correlation of counter values from nest units in the system.

16. The system of claim 13, further comprising a plurality of performance counters to count signals representing occurrences of events at the plurality of the processor units.

17. A non-transitory computer-readable storage medium comprising operational instructions that, when executed by a processor, cause the processor to:
- provide a register operation that includes a bit field command set to at least one of a pause, a stop, a restart, or reset operation; and
- send the bit field command across a scan communications interface (SCOM) by using a computing fabric,
- wherein sending the bit field command across the SCOM globally synchronizes a plurality of performance monitoring units (PMUs).

18. The computer-readable storage medium of claim 17, wherein the global synchronization of the PMUs provides correlation of counter values from nest units in the system.

19. The computer-readable storage medium of claim 18, wherein the correlation of values from nest units in the system occurs during any period of the pause and the reset operations.

20. The computer-readable storage medium of claim 17, wherein a pre-scale counter is provided before a main counter.

* * * * *